United States Patent
Moresco et al.

(10) Patent No.: US 7,989,051 B2
(45) Date of Patent: Aug. 2, 2011

(54) MAGNETIC MODULAR COATING

(75) Inventors: Andres Gabriel Moresco, Buenos Aires (AR); Washington Adhemar Perez Igiel, Buenos Aires (AR); Juan Maria Serrano, Buenos Aires (AR)

(73) Assignee: Anthem Leather, Inc., High Point, NC (US)

( * ) Notice: Subject to any disclaimer, the term of this patent is extended or adjusted under 35 U.S.C. 154(b) by 976 days.

(21) Appl. No.: 11/813,880

(22) PCT Filed: Jan. 13, 2005

(86) PCT No.: PCT/IB2005/000071
§ 371 (c)(1),
(2), (4) Date: Jul. 13, 2007

(87) PCT Pub. No.: WO2006/075198
PCT Pub. Date: Jul. 20, 2006

(65) Prior Publication Data
US 2008/0206515 A1    Aug. 28, 2008

(51) Int. Cl.
*B32B 3/20* (2006.01)
*E04B 2/42* (2006.01)

(52) U.S. Cl. ........ 428/178; 428/128; 428/188; 428/900; 52/284; 52/302.4; 52/506.01; 52/578; 52/782.1; 52/793.1

(58) Field of Classification Search .................. 428/121, 428/128, 174, 178, 179, 182, 188, 900; 52/284, 52/302.4, 403.1, 415, 506.01, 578, 782.1, 52/793.1
See application file for complete search history.

(56) References Cited

U.S. PATENT DOCUMENTS

| | | | |
|---|---|---|---|
| 3,609,934 A * | 10/1971 | O'Carroll | .............. 52/461 |
| 4,425,980 A | 1/1984 | Miles | |
| 4,589,243 A | 5/1986 | Abendroth | |
| 6,219,983 B1 | 4/2001 | Gråkjaar Jensen et al. | |

* cited by examiner

*Primary Examiner* — Donald Loney
(74) *Attorney, Agent, or Firm* — Norris McLaughlin & Marcus P.A.

(57) ABSTRACT

This invention relates to a magnetic modular coating for floors and walls, even in wet sites and under water, that is composed of a sole fixing element laid between a magnetic adherence decorative plate and a metallic framework structure (3). Such coating also includes a bi-directional magnetic adherence layer (4) of minimum thickness; a decorative surface layer (5), and an upper rigidifying sheet (6) made up of a laminar unit. Adhesives used can be of any kind suitable to join components together. The modules allow for a fast installation, are easily removable and can be re-used.

15 Claims, 5 Drawing Sheets

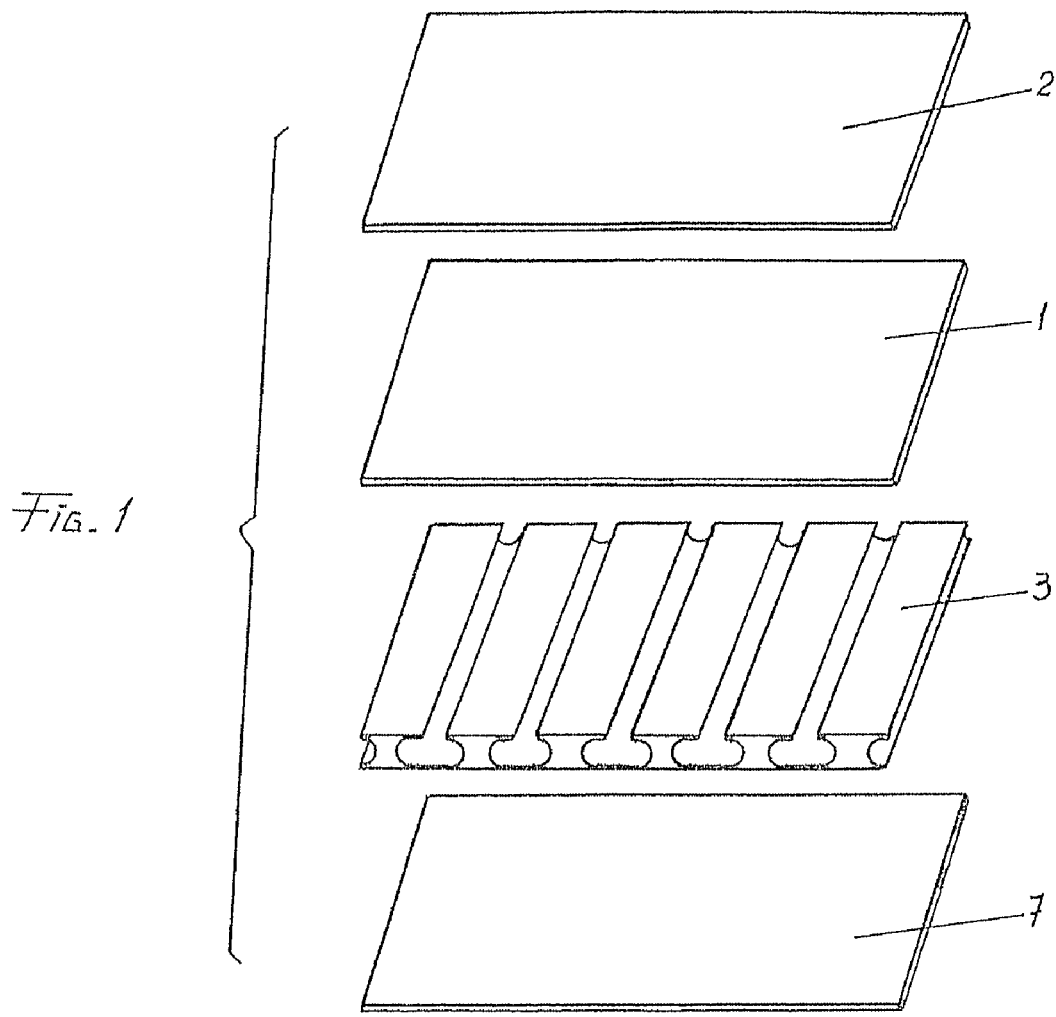
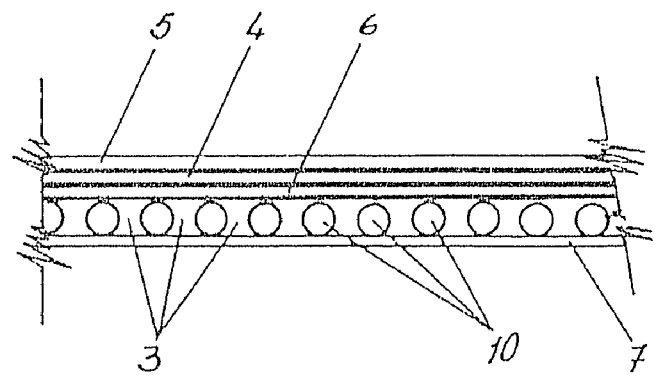

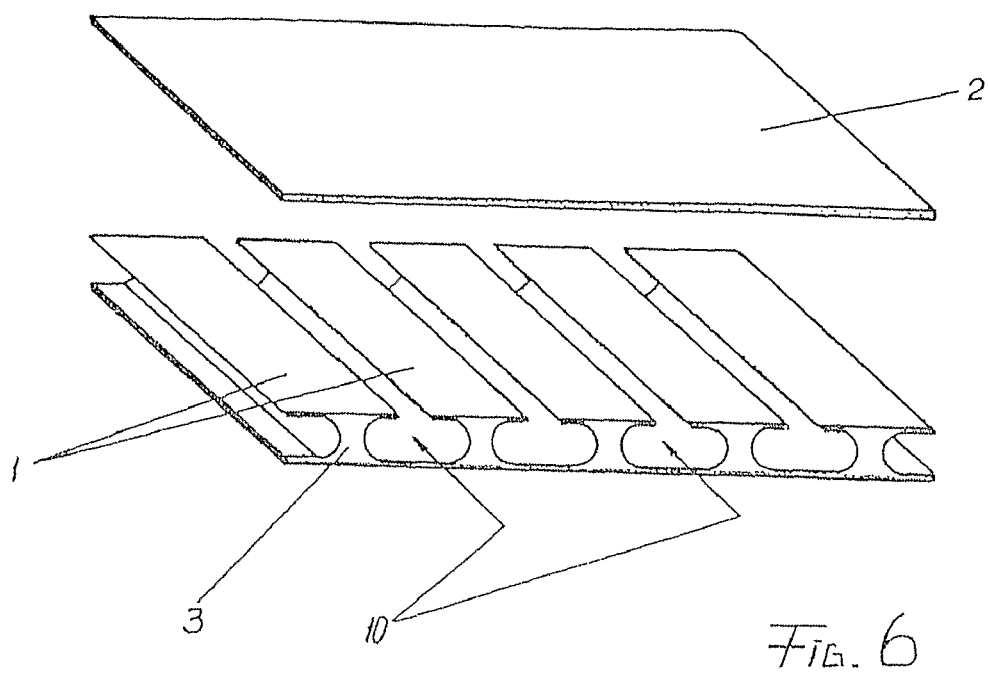
Fig. 6
Fig. 7
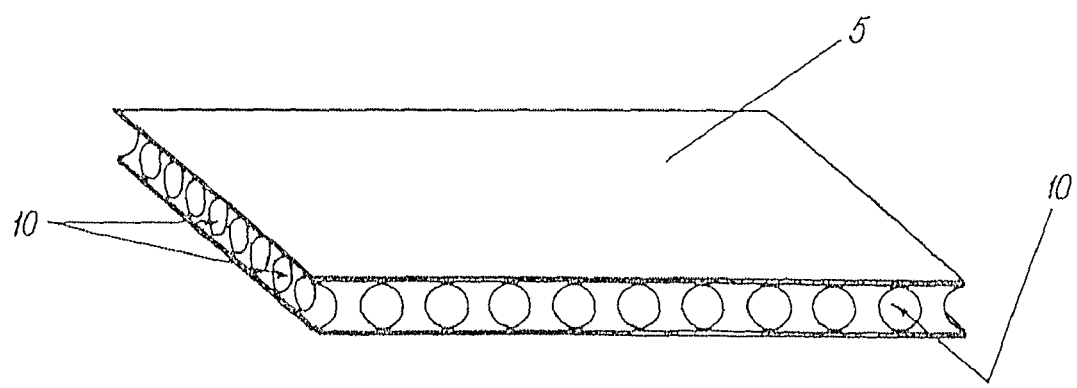

MAGNETIC MODULAR COATING

OBJECT OF THE INVENTION

This invention relates to a magnetic modular coating for floors and walls, even in wet sites and underwater, that is composed of a sole fixing element laid between a magnetic adherence decorative plate and a metallic framework structure. Such coating also includes a bi-directional magnetic adherence layer of minimum thickness; a decorative surface layer, and an upper rigidifying sheet made up of a laminar unit. Adhesives used call be of any kind suitable to join components together. The modules allow for a fast installation, are easily removable as can be re-used.

BACKGROUND OF THE INVENTION

Accomplishments designed for floor coating or wall coating are numerous as well as such coating applied on items used daily. The development of new material has allowed that coating material can be applied to more objects, and no mistake could be made if we say that almost any object can be coated. In consequence, then material and site of application are left to the exclusive taste and creativeness of user.

The application of diverse coating methods is well-known to the inventor which, as it is obvious, is closely related to the material onto which coating will be applied, or to the coating constituent material, or to both.

Considering the existing variety and large number of coating material available, the following is an overview that will introduce us into the subject matter discussed in this invention.

Vinyl Floor Tiles. The following are basic tools for installation: measuring tape, pencil, chalked string, ruler or metal square, a sharp utility knife and a roller. Once installer is Vinyl Floor Tiles. The following are basic tools for installation: measuring tape, pencil, chalked string, ruler or metal square, a sharp utility knife and a roller. Once installer is furnished with these basic tools, he should proceed with the preparation of subfloor. Subfloor should be resilient, single-layered, smooth and well-bonded; subfloor should be preferably dry concrete and plywood-overlay wood floor; subfloor should be levelled, clean and free of wax, grease, oil or dust. If necessary, patch or fill any cracks and smooth out textures or embossing on old floor. It is recommended to avoid creating dust as products may contain asbestos fibers or crystalline silica. The inhalation of such dust is a cancer and respiratory tract hazard.

Preparation of the site includes that all furniture and appliances be removed. Baseboard moulding should also be removed and doorframes undercut to facilitate tile installation around them. Then, guidelines should be marked from the centers of opposite walls and lay rows of tiles in both directions from the center so that most cuttings face borders. Peel the backing from a tile and place it at the center point. Press tile down firmly into place. Then proceed with all remaining tiles and position tiles so arrows on back all point in the same direction. Further to marking cutting lines, tiles should be cut and placed on borders. Finally, roll on tiles to ensure that tiles are firmly stuck down.

Floating Floor: Installation of a floating floor is more complicated than the installation of vinyl floor tiles. It is recommended to install the three first rows straight-lined, aligned, and firmly bonded. Apply a suitable amount of adhesive on the top portion of tongue and to the bottom portion of groove to ensure a water-resistant joint. However, an excessive amount of adhesive can cause expansion of the joint. When installing planks, it is recommended to avoid striking planks hardly or in excess because tongues can be damaged and joints can be lifted.

First, the installation site should be divided by the width of plank, and, if remainder is less than 6.35 cm, 6.35 cm should be cut from the width in the first row; or, difference should be added to the width of plank and divide by two for room balance. For hard-surface floors, 2-in-1 foam-coating is required all along the starting wall and then cut to length. In order to minimize repetition of patterns, it is recommended to apply product from, at least, 3 different cartons. All irregularities require cutting of the first row of planks to adjust to wall contour; then, place piece by using a pull bar to tighten last board in place. Adjustment to irregular walls is accomplished by means of two spacers used as wedge; by using spacers along each wall side, an expansion area is maintained. A good-quality carbide-tipped cutting blade is recommended for use with compound and laminated material such as melamine, wood boards or other hard and thick material. Cuttings will be performed to balance room appearance, leaving a longer board at the end of the first row. Installation should be made by using clamps on the first three rows, and only after adhesive is dry, installation of one row at a time could be continued.

Vinyl Floor: Laminated floors consist of tiles that can be installed indoor onto a large variety of surfaces on a free-floating configuration that does not require being fastened to any subfloor. A separation on walls, piping, doorway, ducts, etc is required to allow for the floating floor to move freely with season changes; however, installations in kitchen and bathroom require silicone caulking to fill such separation.

As in previous case, a starting point requires measuring distance between starting wall and finish wall; then, divide this number by the width of board. If less than 6.35 cm are in excess, then 6.35 cm should be cut from the width in the first row, or to balance room a difference of 6.35 cm should be added to board and divide by two. Then, stretch 2-in-1 foam coating for hard floors, or moisture-barrier sheeting along starting wall, and cut to length. All wall irregularities require cutting of the first or last row of boards to adjust to wall contour. As in the preceding example, spacers should be used and, if required, pieces should be cut to adjust them to such irregularities.

Wall-to-Wall Carpet: Wall-to-wall carpeting is a highly decorative covering that provides great warmth to any room. In addition, carpets are effective thermal and acoustic insulators. Carpets have different characteristics, i.e., carpets suitable for heavy traffic, for outdoor use, or for indoor areas. Installation tools required are glue for carpets, double-faced self-adhesive tape, a strip of wood, and, optionally, a heavy wood board. Also, a serrated-edge spreader, a precision sharpened blade or a knife-blade, a hammer, a rubber hammer; an adhesive spreader, and, optionally, a measuring tape; a carpet stretcher (knee kicker) and an edge trimmer. Installation procedure starts with unrolling carpet and extending it on the surface to be covered. Then, lay one side of carpet (machine-trimmed bide) against a wall. If carpet has any pattern on it, pattern should be left parallel to the main axis of room. Once carpet has been extended, it should be temporarily fastened to floor with double-faced self-adhesive tape, and installation should start from room center toward corners. Then, continue stretching and fastening to finally cut carpet and leave a margin on all sides of approximately 8 cm. Once the above step is complete, carpet can be is glued to floor by applying glue with a serrated spreader to avoid formation of air bubbles. Then, in a preferred mode, a heavy wood board should be laid down onto carpet and tapped with a rubber hammer to ensure that carper is well fastened to floor. Carpet excess can be trimmed with a precision sharpened blade or an edge trimmer.

Alternatively, carpet could be semi-fastened by using double-faced adhesive tape.

Ceramic Tile Floor: installation of ceramic tile floor is by means of a universal popular method where it is important that tiles may be cut and installed in original sequences. Materials required for this installation are: adhesives for ceramics, water, steel wool, joint sealer; grout, white cement, nylon, steel nails, notched trowel, hammer, rubber mallet, level, tile cutter, trowel, chisel and bucket used in masonry. First, define layout of tiles on the floor. Then, apply adhesive with a notched trowel and finally lay tiles onto floor tapping them with a rubber mallet to ensure better fastening and a more levelled floor.

Ceramic Tile Floor has two disadvantages: it is cold and hard.

Solid Wood Floor: First, remove existing floor coating and clean supporting points. Then, cut boards to the required length as well as strips of soundproofing material to be laid on support.

Thermal and acoustic insulation can be improved by introducing polyurethane blanket onto support. A row is started with the remaining portion of the previous row and thus, in most cases, obtaining that transverse grooves remain in an alternate position. Then, a strip is glued and tapped until it is fully inserted into groove. Once installation is completed, base mouldings and finishing mouldings should be re-installed. Wood floors can also be nailed. This installation mode is typical of traditional parquet. This floor type isolates wood floor from subfloor, improves sound and thermal insulation, and makes walking on it more comfortable.

Though distance between floor and subfloor allows space for piping installation—an undeniable advantage—this floor type is not suitable where room humidity is high or in radiant heated subfloors with embedded piping. Another drawback is that installation is highly technical and slow. When remodelling, a well-prepared subfloor is required and glue must be applied in the proper amount.

Wallpapering: In the event of wall or ceiling papering, decorated paper is typically applied. First, define number of paper rolls required. Avoid making partial purchases of material which would result in obtaining paper rolls from different lots. Use of wallpaper from different lots almost surely will show differences in colour which will be noticed when installation work is finished and dried. Then, define beginning of different patterns in series to avoid pattern discontinuance in consecutive strips of paper. This will likely cause discarding portions of several paper rolls, the size of which will be related to pattern repetition. First, prepare surface on which wallpaper will be applied, since flaws will be noticed depending of how thick paper is. When wall surface preparation is troublesome, it is convenient to apply liner paper to provide an intermediate coating that masks imperfections. However, if surface would show cracks or lumps, such liner paper will not be an effective solution. After wall surface irregularities are smoothed out, cut paper slightly exceeding the surface size to be covered and then proceed with the application of a suitable adhesive.

Once adhesive has been applied, let it set for some time and then unroll paper and apply to surface. During application, avoid air between surface and paper which can be sorted out by using a flat tool (broad knife) or smoothing brush to "sweep out" air bubbles and move them out to the borders. Before wallpapering, base mouldings at the bottom of wall should be removed. When re-installing base mouldings, these will cover paper and cuttings will not be noticed. Paper excess at the bottom of wall should be cut before adhesive dries up to avoid scraping of paper on the adjacent surface. A frieze can be applied on the top edge of wall to give a more suitable finish.

So far, we have seen that the floor/wall coatings described in the preceding pages pose a number of inconveniences. Among inconveniences, installation techniques as well as the required tools become a major challenge.

The inventor is also acquainted with a number of patent disclosures related to the subject matter of this invention. Such patent disclosures are the following:

Argentine Patent no. 110971 referring to building construction material for floor reticulate or similar material composed of sheets that provide means of immobilization respect of transverse sheets; Argentine Patent no. 114522 referring to floor building construction material, and Argentine Patent no. 197563 consisting of improvements in height-adjustable modular floors.

In addition, Argentine Patent no. 212048 consisting of a portable mezzanine level composed of modular parts and a pattern for construction of such parts; Argentine Patent no. 214588 consisting of a grid being a component part of floors, footbridges, floorboards or similar, where a plurality of profiles are mutually involved and assembled onto each other by means of grooves carved on such profiles and joined by means of welding work, fastening means, etc., and Argentine Patent no. 227077 referring to flooring for railway passenger cars composed of layers from a base provided with a plurality of longitudinal grooves.

Consideration is further given to Argentine Patent no. 231010 protecting a coating for ceilings, walls and similar; Argentine Patent no. 231656 consists of a modular panel for floor and mezzanine building construction, and Argentine Patent no. 242279 referring to a coating panel provided with peripheral engagement.

Finally, Argentine Patent no. 247262 referring to an arrangement of modular plastic tiles mutually involved and forming a floor covering; Argentine Patent no. 248808 relating to improvements in an anchoring device for wall assembly; Argentine Patent no. 249303 relating to a new floor especially fit for sports practice, and Argentine Patent no. 249569 consisting of a new device for floor tiling.

None of the above patent disclosures can be considered an obstacle to this invention that relates to a magnetic modular coating. The inventor has considered a number of subject matters that led him to develop such magnetic modular coating as herein disclosed. Among subject matters under consideration, a key matter has been a great number of difficulties encountered when replacing a floor coating.

As a result, it is an object of this invention to obtain a floor coating that can be easily installed or replaced.

It is another object of this invention to obtain a floor coating composed of modules, and that these modules can be standardized.

It is yet another object of this invention to obtain a floor coating that can be laid onto an existing surface.

It is further another object of this invention to obtain a floor coating, removable type-like, that can be removed, transported, and re-used.

Yet, it is another object of this invention to obtain a coating in which any material can be used in the coating finish.

BRIEF DESCRIPTION OF THE INVENTION

Basically, the magnetic modular coating of the invention is composed of a sole fixing component part inserted between a magnetic adherence decorative plate, and a metallic framework structure; a bidirectional magnetic adherence layer; a decorative surface layer; an upper rigidifying sheet and adhesives bonding the diverse component parts in this system.

Alternatively, this invention includes a lower rigidifying sheet and a fitting

The magnetic modular coating of the invention is composed of a sole fixing element laid between a magnetic adherence decorative plate and a metallic framework structure.

Said coating also includes a bi-directional magnetic adherence layer; a decorative surface layer, and an upper rigidifying sheet.

Said structure is composed of low-weight metallic frames and struts composed of "C" shaped folded sheet metal standardized profiles, arranged vertically, onto which decorative plates are applied.

The decorative plates are provided with side flanges made up of its folded sides in longitudinal direction, and matching such side flanges of adjacent decorative plates. Said side flanges are screwed to struts placed on structure and to the last decorative plate, said decorative plate format being adjusted to the wall opening to be covered, and fixed by a side flange to one of the sides by using one of the struts as a supporting wedge.

A fixing screw in the last decorative plate is placed at the expansion joint.

A fixing element provides a bi-directional magnetic adherence layer of minimum thickness.

An upper rigidifying sheet is made up of a laminar unit. Adhesives used can be of any kind suitable to join components together.

After the diverse component parts of the magnetic modular coating of the invention have been defined, a supplemental description follows which provides a discussion of the operating aspect of its parts and of the results obtained.

The advantages of this invention in contrast with the existing accomplishments available are numerous in several aspects. The following description is designed solely to provide an idea of the advantages of this invention over traditional floors. This description should not be considered exhaustive though merely a guidance.

Key advantages of magnetic modules for coating are:
Fast installation; when moving, modules can be re-used without any deterioration of its parts; even user himself can install them as no special training is required;
Installation is clean as use of adhesives and mechanical fixing devices can be omitted;
Modules can be easily replaced in the event of damage or break of the surface layer; its diverse parts, either decorative or structural, can be rearranged to make up different patterns;
Floor installation can be performed in sites under construction, and installation of the upper surface be accomplished once construction is completed;
Floor surface layer can be removed to perform cleaning on specific areas;
Expenses on storage and delivery of replacement parts are saved;
Magnetic modules allow for making up variable-surface pieces by thermodeformation;
Magnetic modules are waterproof, and their adherence quality is not altered by humidity or water;
Installation facilitates access to ducts under floor;
Modules can be removed to prevent damage when maintenance work in being performed in the room;
Adherence is stronger than in unidirectional magnetic systems; due to lesser module thickness, less tanned leather material is required. Leather material can be tanned with diverse technologies and can be finished in a variety of fashions.
Magnetic modular coating has dimensional stability;
It allows for thermofolding:
Material edge does not show on the visible corner of modules, and it reduces installation time as it avoids removal of existing floors.
Light-weighted and fit for all kinds of vehicles; preferably, for vehicles where weight is a key factor, such as aircrafts, spacecrafts and watercrafts.
It is also fit to be installed in wet sites, even under-water, such as swimming-pools, bath tubs, whirlpools (Jacuzzi), kitchen sinks, sinks. Ideal for stands which will be exhibited for a short period, as well as for sites where assembly and disassembly time is critical, such as event sites with a customized decoration, movie sets and stage design for movie theaters, visual arts, television, drama theaters, opera houses, coating material in promotion sites at fairs and exhibitions, etc.

In order that this invention can be understandable and easily carried into practice, it will be described in that follows a detailed description of a preferred mode of embodiment. Such description includes a reference to the accompanying drawings.

BRIEF DESCRIPTION OF THE DRAWINGS

FIG. 1 shows an exploded perspective view where the diverse component parts of the invention are shown.

FIG. 2 shows a sectional side view of a module.

FIG. 6 is a perspective view of a module divided in its component parts and provided with ducts.

FIG. 7 is a perspective view of the module shown in FIG. 6, but in which said module is assembled and ducts in such assembly are composed of diverse sections.

Figure 3:
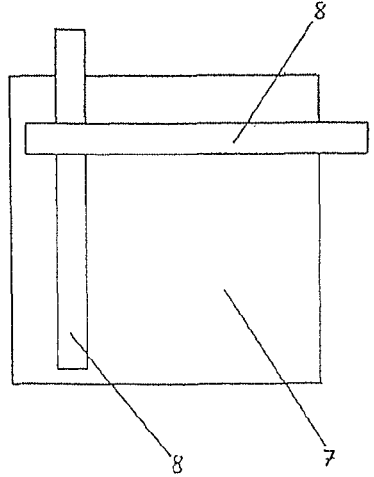
FIG. 3 shows a view of a module to which contact bands are attached in order to improve adherence.

In the Figures, same reference numbers indicate equal parts or corresponding parts, in which number (1) is a fixing component part; number (2), a magnetic adherence decorative plate; number (3), a structure; number (4), an adherence layer; number (5), a decorative surface layer; number (6), an upper rigidifying sheet; number (7) a lower rigidifying sheet; number (8), a contact band; number (9), a ground connection; number (10), a duct; number (11), a microperforation; number (12), a channel; and number (13) is a traction band.

DETAILED DESCRIPTION OF THE INVENTION

Basically, said magnetic modular coating is composed of a sole fixing component part (1) inserted between a magnetic adherence decorative plate (2), and a metallic framework structure (3); a bidirectional magnetic adherence layer (4); a decorative surface layer (5); an upper rigidifying sheet (6), and adhesives bonding the diverse component parts in this system.

Alternatively, this invention includes a lower rigidifying and fitting sheet (7)., contact bands (8), ground connections (9), ducts (10), microperforated (11) plates, channels (12) and traction bands (13).

In a preferred embodiment of the magnetic modular coating of the invention, a sole fixing component part (1) is provided that is inserted between a magnetic adherence decorative plate (2), and a metallic framework structure (3).

Such magnetic modular coating also includes a bidirectional magnetic adherence layer (4); a decorative surface layer (5) made up and finished with diverse materials; an upper rigidifying sheet (6) and adhesives bonding the component parts.

Optionally, such magnetic modular coating includes a lower rigidifying and fitting sheet (7).

The magnetic modular coating of the invention disclosed herein is comprised of a structure (3) composed of very lightweight metallic framework onto which decorative plates (2) are laid.

Such decorative plates (2) are provided with side flanges matching such side flanges provided on adjacent decorative plates (2) which, by juxtaposition, are mutually engaged and prevent displacement.

Such decorative plates (2) will remain rigid as a consequence of said side flanges which originate from the folded sides of such decorative plates in a longitudinal direction; and, consequently, said side flanges being able to resist the stress requested between structure is (3) struts; being such struts composed of "C" shaped folded sheet metal standardized profiles arranged vertically.

Installation of said decorative plates (2) is accomplished by screwing one of the side flanges to one of the struts in structure (3) which will receive the side flange of the adjacent decorative plate (2).

To finish installation, the last decorative plate (2) will be cut to adjust to the wall opening to be covered. Such decorative plate (2) will be fixed by a side flange on one side and by using a strut as supporting wedge.

The screw fixing this last decorative plate (2) will be placed within the last portion (centimeter) of said decorative plate. Such place is reserved for the expansion joint which will be further covered with ornamental accessories.

The advantages of this magnetic modular coating will allow for coating installation with no need of partition panels.

Among numerous advantages of this invention, fast installation becomes a main factor in the event of new construction projects.

As a result of the use of structure (3), such magnetic modular coating is not affected by rugosities or by any other imperfections found in current partition panels. It is easily removable and reusable without any deterioration when modifying parameters layout. Since being reusable, it does not become part of waste and debris of construction projects.

A fixing component part (1) is water-resistant to avoid deterioration, and it provides a ferrous-kind surface to preserve adherence and be unaffected by isolation layers.

Such applied coating should not be extremely isolating to weaken magnetic attraction qualities.

A covering component is applied onto such metal surface of the fixing component part (1) to provide protection from rust and corrosion; however, in the preferred embodiment of the invention, said metallic surface is substituted by a bi-directional magnetic adherence layer (4) made up of synthetic material available in rolls or sheets. Such synthetic material provides a plurality of magnetized particles that prevent incidental displacement of the upper part.

Such bi-directional magnetic adherence layer (4) is composed of magnetized particles (e.g. ferrite) and a thermoplastic bearing that enables said bi-directional magnetic adherence layer to adopt diverse temperature-controlled deformations.

In cases where such magnetic modular coating is used as flooring, this adherence layer (4) should be provided with a magnetic field strong enough to resist heavy transit of people without moving or unsticking.

A minimum thickness used in the adherence layer (4) permits that floor level exhibits only a slight rise with respect to the existing floor level after the modular magnetic coating is installed.

In addition, said adherence layer (4) comprises a surface that can be fixed to any other surface and by any method.

Preferably, the material used in said adherence layer (4) should be treated to obtain crossed magnetic fields. When overlapping, said crossed magnetic fields become stronger and more effective at greater distances. In turn, intermediate fields become cancelled thus providing a wider operating range.

When acting bidirectionally, such adherence layer (4) creates a suction effect in respect of the lower metallic sheet.

A decorative plate (2) or a surface layer (5) of such decorative plate can be composed of any kind of material, either organic or inorganic, and either of them is provided with, at least, a suitable side to be exhibited as surface finish.

Obviously, any material-either existing material or material to be created- can be used for such decorative plate (4), or for said surface layer (5). The list of such material includes leather, metal, stone, wood, oil derivatives, rubber, ceramic, etc.

An upper rigidifying sheet (6) is comprised of a sheet unit composed of synthetic material which will be designed, at least, to rigidify the upper portion of decorative plates (4).

Among materials that can be used to build such sheet unit are: foamed or non-foamed PVC laminates, oil derivatives, ferrous and non-ferrous metals, wood derivatives, resin derivatives of any kind, etc.

In an alternative embodiment of the invention, a lower rigidifying sheet (7) is provided, that consists of a sheet unit made up of suitable material and designed to rigidify the lower portion of this coating system.

Use of said lower sheet (7) is convenient when such sheeting magnetic coating will be used as floor. In this case, said lower sheet (7) will allow for balanced distribution of loading efforts.

Among materials that can be used in the construction of such lower sheets (7) are: phenolic base wood laminates, foamed or non-foamed PVC laminates, oil derivatives, ferrous metals and non-ferrous metals, wood derivatives, resin derivatives of any kind, etc.

Adhesives used can be of any kind as long as they be suitable to join all component parts together. However, contact adhesives of any base are preferred.

In some cases, it could be necessary to increase adherence in the coating modules, e.g., when modules are to bear structural stress.

Under such circumstances, use of contact bands (8) is appropriate. Such contact bands (8) can be fixed onto the lower surface of the lower rigidifying shhet (7).

An example of the preceding case is provided in FIG. 3, where said contact bands (8) are laid parallel to two sides of a module sides. Such contact bands (8) become interwoven in a point closer to one of the vertexes and projecting out of the perimeter of said module to relate to adjacent modules.

Figure 4:
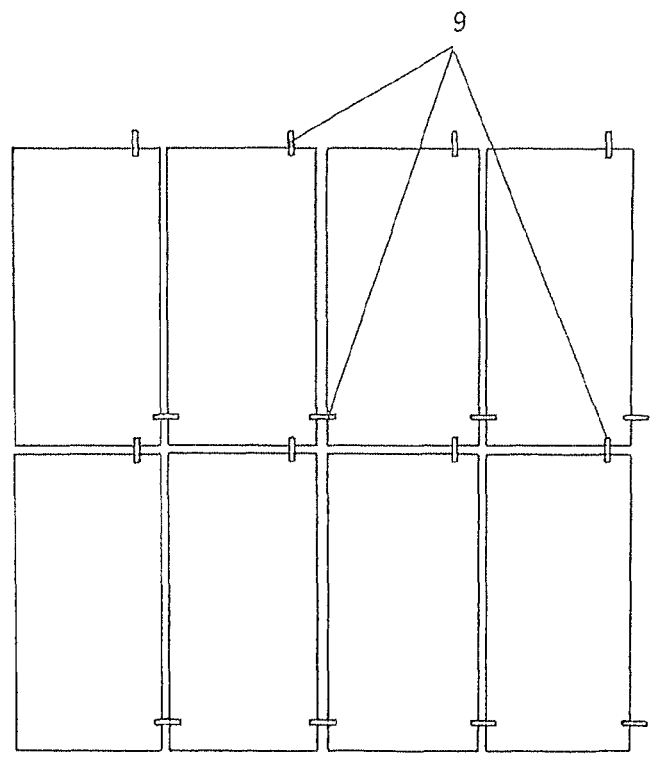
FIG. 4 shows a plurality of modules in which ground connections are shown.
Figure 5:
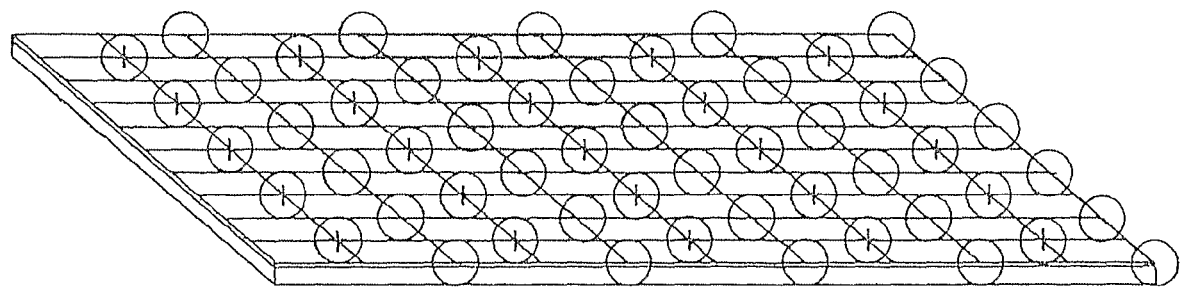
FIG. 5 shows a perspective view where the magnetic fields are shown.

Considering that modules described can be applied onto a large variety of places, it is necessary that ground connections (9) are provided to obtain better isolation if metallic parts are included in the modules. A layout of said ground connections (9) is shown in FIG. 4, in which said connections are related to mutually adjacent modules.

Ducts (10) provided in the diverse modules allow for a variety of useful applications.

As shown in FIG. 6, structure (3) provides a plurality of ducts (10) which can be accessed to from the upper surface by removing decorative plate (2).

Ducts (10) can be used for cable-laying, for ventilation, or for both purposes.

FIG. 7 shows a module in which ducts (10) are provided with different sections and are interwoven so that cable-laying can be oriented in any direction and the module position be unaltered.

In addition, and unlike module in FIG. 6, FIG. 7 shows a module that allows for cable branching.

Figure 8:
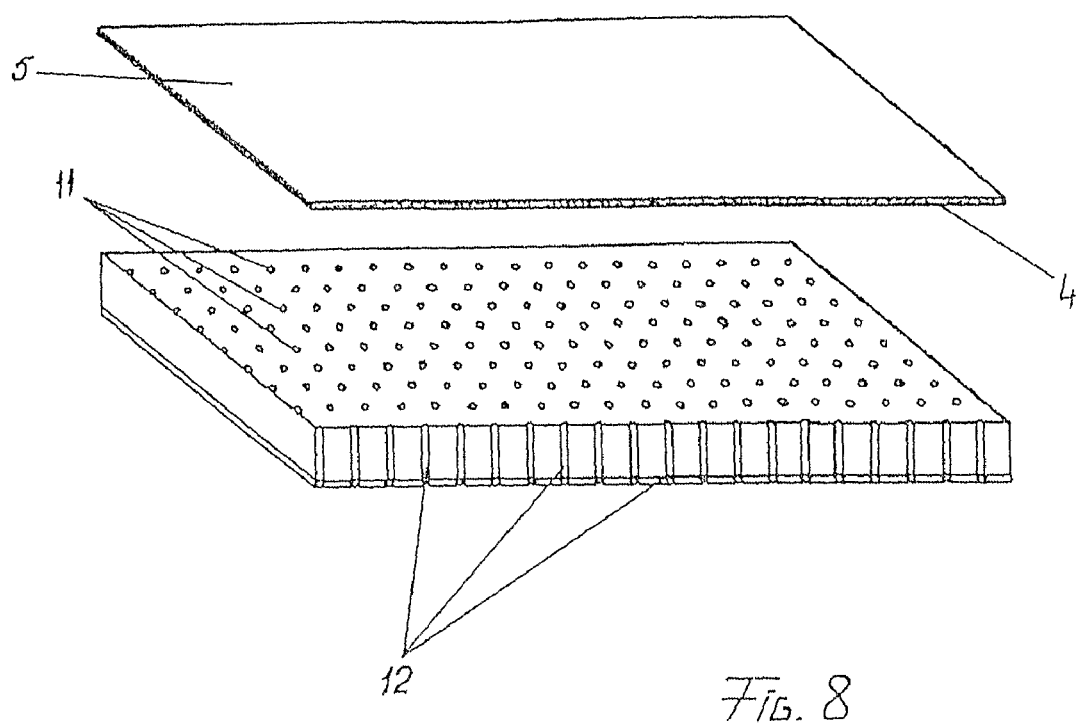
FIG. 8 is a perspective view of a module in which microperforations and a plurality of channels are shown.
Figure 9:
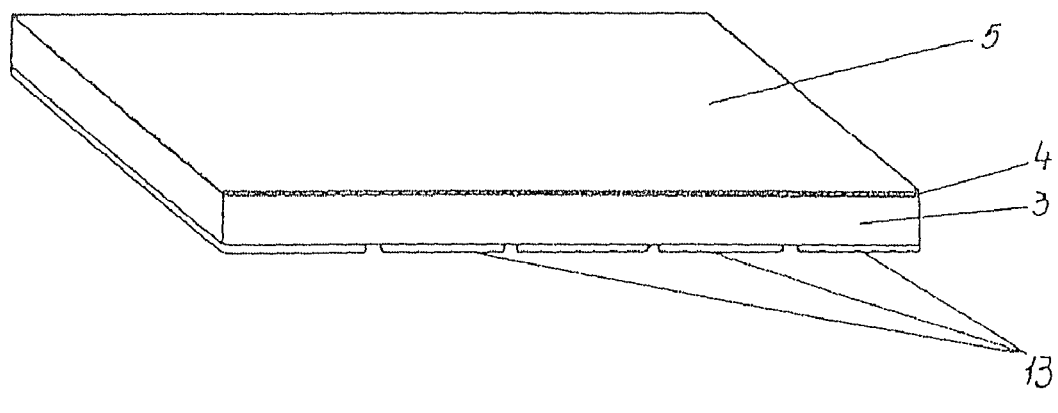
FIG. 9 provides a perspective view of a module of the invention wherein traction bands are applied.

FIG. 8 is a perspective view of a module provided with a plurality of microperforations (11) as well as with a plurality of channels (12) which become ducts for exhausting adhesive vapours.

Persistence of such vapours in the environment can affect some of the material applied onto decorative plates (2). The said microperforations (11) and channels (12) facilitate that adhesive vapours be rapidly eliminated to the environment and that time in contact with such material be reduced to a minimum.

As said adhesive vapours can be harmful for humans, this solution allows for a rapid elimination of typical adhesive smells and for a faster room.inhabitability.

Traction bands (13) that can create traction in certain areas have been provided to improve poor-adherence areas.

This invention introduces substantial modifications in construction work and provides solutions unimagined until recently.

As a matter of fact, we have already mentioned that floor installation can be accomplished during construction period. And, only upon completion of the construction project, proceed with the installation of final plates, i.e., decorative plates (2). These decorative plates can be installed after debris removal and cleaning.

It is important to keep in mind that installation of such decorative plates (2) can be accomplished without any mechanical device nor any adhesive. It is therefore a "clean" installation.

Structure (3) allows for easy removal of any sections of such magnetic coating, and facilitates access to cable ducts as well as pipe ducts of any kind. Said cable/pipe ducts can be accessed almost immediately to perform control and repair operations without any break or dust or debris.

The selected pattern for decorative plates (2) can even indicate the location and routing of certain pipe ducts or cable ducts.

Considering that structure (3) is composed of metallic components, and that the remaining components can be made up of any material, such components as used in certain circumstances, i.e. create a coating for transportation vehicles, can be made of fireproof material.

Therefore, the material used in the creation of the diverse components in this invention can consider certain characteristics or conditions according to the location where such magnetic coating will be installed.

Among many other applications, the magnetic coating of the invention can be used at home, office, commercial stores or in access flooring systems; in very low-height floors and as floors where decorative modules can be interchanged.

It can be used as glueless wall-to-wall carpet; self-adhered carpets; continuous stair coating, and easily installed and removed rollable coatings.

It can be conveniently applied onto roofs, easily replaceable ceilings, and as supporting base of visible or hidden pieces. It can also be applied to make up easily replaceable decorative or functional modules; furniture of any kind, such as kitchen furniture, countertops, desks, placards, cupboards, etc.

All the above provides a description and a definition of the nature of the invention disclosed herein, as well as the scope and manner in which its essential idea can be accomplished, which all together become solely a demonstrational and non limitative example of the invention. Furthermore, the components described in such drawings could be selected from a variety of equally effective components, without this being a deviation of the principles of this invention set forth in this description. Therefore, the following is claimed to be an invention and the exclusive property of its owners:

The invention claimed is:

1. A magnetic modular covering system for installation onto a given surface, comprising:
    a surface decorative layer (5), a bi-directional magnetic adherence layer (4) arranged below the decorative layer, a metallic framework structure (3) and an upper rigidifying sheet (6), wherein said structure (3) is composed of a very low-weight metallic framework with ducts, onto which the decorative layer (5) and the adherence layer, having a minimum thickness, are laid; said upper rigidifying sheet (6) being made up into a laminar unit.

2. A covering system according to claim 1, wherein the adherence layer is a sole fixing component (1) and the decorative layer is a magnetic adherence decorative plate (2), with said structure (3) being composed of a very low-weight metallic framework and struts composed of "C" shaped folded sheet metal standardized profiles arranged vertically, and with said decorative plates (2) being provided with side flanges made from its folded sides in longitudinal direction; said side flanges being mutually engaged with respective said side flanges in adjacent decorative plates (2); said decorative plate (2) defining a format adjusted to a surface to be covered, and said decorative plate (2) being fixed by a side flange to one of the sides by using a strut as a supporting wedge, and a fixing screw in the last decorative plate (2) being placed at a expansion joint, and wherein at least parts of the components being adhered to each other by adhesive.

3. A covering system according to claim 1, wherein a lower rigidifying and fitting sheet (7) is provided, said lower rigidifying and fitting sheet (7) being composed of a laminar unit made of material selected from the group consisting of foamed and non-foamed PVC, oil derivatives, ferrous metals, non-ferrous metals, wood derivatives and resin derivatives.

4. A covering system according to claim 3, wherein contact bands (8) are included on a lower surface of said lower rigidifying and fitting sheet (7), and said contact bands (8) are laid parallel to two sides of the sides of said surface, and said contact bands (8) become interwoven in a point closer to one of the vertexes, and project themselves out of the perimeter of a module relating to adjacent modules.

5. A covering system according to claim 2, wherein said folded sheet metal standardized profiles provide a plurality of said ducts (10) which are accessible from an upper surface by removing said decorative plate (2)

6. A covering system according to claim 2, wherein said folded sheet metal standardized profiles provide a plurality of said ducts (10) that are interwoven.

7. A covering system according to claim 1, including a plurality of micro-perforations (11) and a plurality of channels (12) that become exhausting ducts for vapors and ventilation.

8. A covering system according to claim 3, wherein traction bands (13) are included on a lower surface of said lower rigidifying and fitting sheet (7).

9. A covering system according to claim 1, including ground connections (9).

10. A covering system according to claim 1, wherein said upper rigidifying sheet (6) is composed of a laminar unit, composed of a material selected from the group consisting of foamed and non-foamed PVC laminates, oil derivatives, ferrous and non-ferrous metals, wood derivatives and resin derivatives.

11. A covering system according to claim 1, wherein said bi-directional magnetic adherence layer (4) is composed of magnetized particles applied onto a thermoplastic bearing, said magnetized particles being ferrite particles.

12. A covering system according to claim 2, wherein said adhesives used are contact adhesives.

13. A covering system according to claim 1, wherein said decorative layer is composed of any kind of material and is provided with at least one side suitable to be exhibited as surface finish.

14. A covering system according to claim 2, wherein said adherence layer (4) defines crossed magnetic fields.

15. A covering system according to claim 2, wherein the fixing component (1) provides a metallic layer onto which a protective covering is applied.

\* \* \* \* \*